MAINTENANCE OF FLAVOR INTEGRITY IN PRESSED MINT ASSORTMENTS

BACKGROUND OF THE INVENTION

Boiled candy mints having assorted flavors have been marketed for many years in unitary packages, usually of tubular or oblong configuration, without notable loss of flavor or "migration" of flavor notes from one mint to another. In boiled candies, the flavor becomes entrapped within the hard candy mass and does not transfer through the mass even though differently flavored mints are positioned adjacent to one another within the unitary package.

Compressed or pressed mint assortments, in contrast to boiled candy varieties, often display undesirable flavor qualities and have therefore met with little commercial success. Flavor problems in pressed mints are considered to be a function of the porous nature of the pressed mint, since the porosity permits the migration of flavors into the air space surrounding the mints, thus contaminating the entire package and destroying the integrity of the taste of each mint. It has been found that consumer acceptance of products diminishes rapidly when unexpected flavors are detected. For example, a cherry flavor note in a citrus or mint flavored candy is judged to be an unusual, but unwanted taste sensation. This off-taste is a result of the intermingling of escaped flavors within the package. The newly formed intermingled flavor contaminates all mints within the package and destroys the integrity of flavors originally present. Marketing of differently flavored pressed mint products featuring this unusual taste sensation, has not met with consumer acceptance. Thus, the free escape of flavor from pressed mints has inhibited the marketing of an assortment of flavors in a single package.

Attempts have been made to utilize various known stabilized flavors in pressed mint formulations in order to prevent escape flavor and obviate the aforementioned contamination problems. Flavoring materials stabilized by treatment with a special coating or encapsulation in water soluble compositions, have been tried in pressed mint formulations. Unfortunately, the coating or encapsulating material surrounding the flavor oil in these products has been found to be incapable of withstanding the temperatures and pressures encountered in pressed mint manufacture. In usual manufacturing techniques, temperatures of 90°F. to 110°F. and pressures up to 12 tons per square inch are frequently used. These conditions apparently cause at least the partial disintegration and/or fracture of the stabilizing coatings and pressed mints containing such "stabilized" flavor oils have been found to suffer from the same disadvantages that occur when untreated flavor oils are used: sufficient amounts of flavor are released to cause intermingling within unitary packages and subsequent contamination of individual flavors.

The types and techniques of coatings used in the stabilized flavor oils which proved ineffective in pressed mint formulations are many and varied. For example, U.S. Pat. No. 2,258,567 describes a gelatin-flavor oil mixture which when dried and ground, provides permanent conservation of flavors. In U.S. Pat. No. 2,369,847, an emulsion of the flavor in an edible hydrophillic colloid (gelatin, pectin, polyvinyl alcohol, gums, etc.) is dried and comminuted to form separately encapsulated micro-droplets or globules of volatile flavor. U.S. Pat. No. 2,857,281 describes the preservation of flavors by spray drying a hot emulsion of the flavor oil in a sugar base, the base being a non-crystalline mixture of at least two different sugars. In a series of patents, U.S. Pat. Nos. 2,886,440 – 445 and 2,886,447 – 448, various processes are described for preparing gelatin coated flavors, including spray drying, tunnel drying, freeze-drying, etc. U.S. Pat. No. 3,205,705 describes flavor seeds formed by alternating layers of flavoring and sugars. All of the above-described products are expensive to produce and none are completely satisfactory in pressed mint assortments.

It is readily apparent that there is a real need for the development of an assorted flavor pressed mint product which would be organoleptically acceptable to consumers.

SUMMARY OF THE INVENTION

From 1 percent to 10 percent, preferably 2.25 percent to 9 percent of a solid particulate emulsion of a flavor oil, when incorporated into pressed mint formulations as the flavor ingredient, has been found to maintain flavor integrity in an assortment of pressed mints packaged with different flavors adjacent to one another in a unitary package. Preferably, the pressed mints in the assortment are flavored with orange, lemon, lime, imitation cherry, wintergreen, imitation pineapple, grapefruit, and peppermint flavors.

DESCRIPTION OF THE INVENTION

It has now been found that by utilizing a solid particulate flavor oil emulsified with a combination of corn syrup solids, an emulsifier and either a glycerol, a nontoxic glycol or mixtures thereof, pressed mints are obtained in which flavor integrity is maintained when differently flavored pressed mints are packaged together in a unitary package. Flavor migration and subsequent distruction of individual flavor qualities does not occur. The solid particulate flavor emulsion utilized, as described in U.S. Pat. No. 2,801,895 and in U.S. Pat. No. 3,041,180, is an emulsion of the essential oil flavor in a mixture of corn syrup solids, an emulsifier, and either glycerol, a nontoxic glycol or mixtures thereof. This product is obtained according to the procedure of the aforementioned patents, by emulsifying the water insoluble essential oil flavor with a molten mixture of the glycerol ingredient and corn syrup solids as the continuous phase, extruding the emulsion mass in the form of filaments into a cold fluid, followed by impact breaking of the solidified filaments into small particles.

The glycerol ingredient used in emulsifying the flavor oil should be substantially anhydrous. Other nontoxic glycols, such as propylene glycol, may be substituted for all or part of the glycerol. This glycerol — glycol ingredient is present in an amount of from 2 percent to 15 percent, preferably 4 percent to 9 percent by weight, based on the total weight of the emulsion.

The corn syrup component of the flavor emulsion is preferably a granulated product having a dextrose equivalent of from 32–62, preferably 42; and containing from 3 to 3.5 percent moisture.

If desired, a minor amount, preferably not more than about 2 percent by weight, of an emulsion or dispersing agent may be added during the preparation of the flavor oil emulsion, either prior to or along with the addition of the essential oils. Suitable emulsifying or disflavor particles are allowed to stand in the isopropanol for 48 hours, after which they are drained and dried under vacuum. The above procedure is used to obtain solid particulate flavor emulsions of peppermint oil, lemon oil, imitation cherry essence, oil of wintergreen and grapefruit oil.

EXAMPLE II

Preparation of Peppermint Flavored Pressed Mints

A pressed candy composition is prepared containing the following ingredients in the quantities specified: Sugar — 92.3 lbs.; Corn Syrup — 3 lbs.; Water — 1.2 lbs.; oil of peppermint solid particulate emulsion — 3.25 lbs.; and Magnesium Stearate — 0.25 lbs.

The sugar, corn syrup, and water are mixed together in a mixing kettle, then passed through an extruder onto drying trays. The trays are dried in an oven at a temperature of 140°F. The dried granulation obtained is forced through a 30 mesh screen. The 30 mesh granulation obtained is added to a mixing kettle. The oil of peppermint solid particulate emulsion (prepared according to the general procedure of Example I) and magnesium stearate are added and the entire mixture is blended in thoroughly. This final blend is pressed into tablets in the usual manner.

EXAMPLE III

Preparation of Orange Flavored Pressed Mints

A pressed candy composition is prepared containing the following ingredients in the quantities specified: sugar — 87.5 lbs.; corn syrup — 3 lbs.; water — 1.2 lbs.; orange oil solid particulate emulsion — 8.05 lbs.; and magnesium stearate — 0.25 lbs. These ingredients are processed following the procedure of Example II and the final blend is pressed into tablets in the usual manner.

EXAMPLE IV

Preparation of Lemon Flavored Pressed Mints

A pressed candy composition is prepared containing the following ingredients in the quantities specified: sugar — 88.5 lbs.; corn syrup — 3 lbs.; water — 1.2 lbs.; lemon oil solid particulate emulsion — 7.05 lbs.; and magnesium stearate — 0.25 lbs. These ingredients are processed following the procedure of Example II and the final blend is pressed into tablets in the usual manner.

EXAMPLE V

Preparation of Cherry Flavored Pressed Mints

A pressed candy composition is prepared containing the following ingredients in the quantities specified: sugar — 93.3 lbs.; corn syrup — 3 lbs.; water — 1.2 lbs.; imitation cherry essence solid particulate emulsion — 2.25 lbs.; and magnesium stearate — 0.25 lbs. These ingredients are processed following the procedure of Example II and the final blend is pressed into tablets in the usual manner.

EXAMPLE VI

Preparation of Wintergreen Flavored Pressed Mints

A pressed candy composition is prepared containing the following ingredients in the quantities specified: sugar — 86.55 lbs.; corn syrup — 3 lbs.; water — 1.2 lbs.; oil of wintergreen solid particulate emulsion — 9. lbs.; and magnesium stearate — 0.25 lbs. These ingredients are processed following the procedure of Example II and the final blend is pressed into tablets in the usual manner.

EXAMPLE VII

Preparation of Lime Flavored Pressed Mints

A pressed candy composition is prepared containing the following ingredients in the quantities specified: sugar — 90.55 lbs.; corn syrup — 3 lbs.; water — 1.2 lbs.; lime oil solid particulate emulsion — 5 lbs.; magnesium stearate — 0.25 lbs. These ingredients are processed following the procedure of Example II and the final blend is pressed into tablets in the usual manner.

EXAMPLE VIII

Preparation of Pineapple Flavored Pressed Mints

A pressed candy composition is prepared containing the following ingredients in the quantities specified: sugar — 88.55 lbs.; corn syrup — 3 lbs.; water — 1.2 lbs.; imitation pineapple essence solid particulate emulsion — 7 lbs.; magnesium stearate — 0.25 lbs. These ingredients are processed following the procedure of Example II and the final blend is pressed into tablets in the usual manner.

EXAMPLE IX

Preparation of Packaged Assortment of Differently Flavored Pressed Mints

Compressed disc-shaped mints prepared in the manner described in Examples II through VI are collated by packaging and wrapping equipment to contain 3 orange, 3 lemon, 2 peppermint, 2 wintergreen and 2 cherry compressed mints in that order in a unitary roll wrap of 12 mints.

EXAMPLE X

Preparation of Packaged Assortment of Differently Flavored Pressed Mints

Compressed disc-shaped mints prepared in the manner described in Examples III through V are collated by packaging and wrapping equipment to contain 4 compressed mints each of lemon, cherry and orange flavors in that order in a unitary roll wrap of 12 mints.

EXAMPLE XI

Preparation Of Packaged Assortment Of Differently Flavored Pressed Mints

Compressed disc-shaped mints described in the manner described in Examples II and VI mixed in equal portions of peppermint and wintergreen flavors are wrapped to produce a random mix of twelve mints in a unitary roll wrap.

EXAMPLE XII

Preparation of Packaged Assortment of Differently Flavored Pressed Mints

Compressed disc-shaped mints, prepared in the manner described in Examples III, IV, V, VII, and VIII, are collated by packaging and wrapping equipment to contain 3 orange, 3 cherry, 2 lime, 2 lemon, and 2 pineapple flavored compressed mints in a random mix of twelve mints in a unitary roll wrap.

Various modifications may be made in the above examples which fall within the scope of the invention.

A significant improvement in the integrity of flavor of the individual differently flavored pressed mints packaged as described in Examples VII and VIII is evident, when the mints are prepared as described in Examples II – VI, to contain the solid particulate flavor emulsions of Example I. By comparison, prior art products, formulated with flavor oils in the usual manner, show intermingling of flavors to the extent that certain delicate flavor notes are completely overpowered.

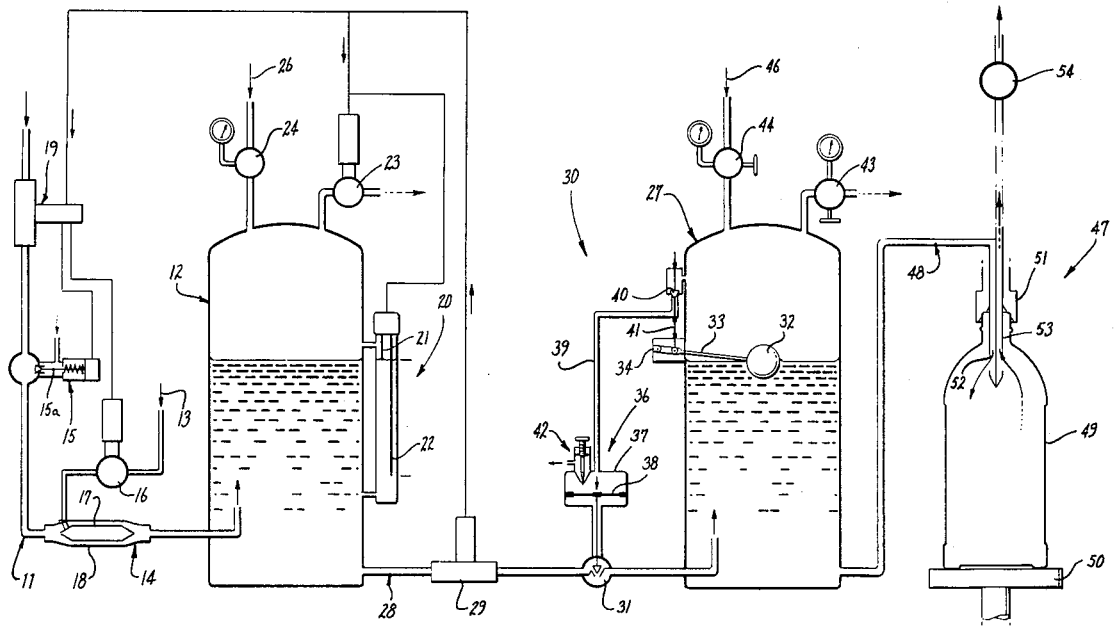

I claim:

1. A process for maintaining the integrity of each essential oil flavor in an assortment of differently flavored pressed mints, when each mint is contiguous to a differently flavored mint in a unitary package, which comprises incorporating an essential oil flavor in the form of a solid particulate emulsion into the mint formulation in an amount of from 1 percent to 10 percent by weight, based on the total weight of the mint formulation, said emulsion containing the flavor oil in a mixture of corn syrup solids and from 2 percent to 15 percent by weight, based on the weight of the total emulsion, of glycerol, or a nontoxic glycol, or mixtures thereof; and subsequently subjecting the mint formulation to a tableting operation to produce pressed mints having flavor integrity.

2. A process according to claim 1 wherein the solid particulate emulsion contains, in addition, an emulsifier.

3. A process according to claim 2 wherein the different essential oil flavors are selected from the group consisting of orange oil, lemon oil, lime oil, imitation cherry essence, imitation pineapple essence, grapefruit oil, oil of wintergreen, and peppermint oil.

4. A process according to claim 2 wherein, in the solid particulate emulsion, glycerol is present in an amount of 4 percent to 9 percent by weight, based on the total weight of the emulsion, and the corn syrup solids have a dextrose equivalent of 32 to 62, and a moisture content of 3 percent to 3.5 percent.

5. A process according to claim 2 wherein the solid particulate emulsion of flavor oil is incorporated into the mint formulation in an amount of from 2.25 percent to 9 percent by weight, based on the total weight of the mint formulation.

6. A process according to claim 5 wherein at least five differently flavored pressed mints are flavored with a solid particulate emulsion of a single essential oil flavor selected from the group consisting of orange oil, lemon oil, lime oil, imitation cherry essence, and imitation pineapple essence.

7. An assortment of differently flavored pressed mints wherein flavor integrity is maintained when each mint is contiguous to a differently flavored mint in a unitary package, comprising at least two pressed mints, each of which is flavored with a different essential oil flavor, said mints being produced by the process of claim 1.

* * * * *

United States Patent [19]
Karr

[11] 3,832,474
[45] Aug. 27, 1974

[54] CARBONATED BEVERAGE SYSTEM

[75] Inventor: Fred A. Karr, Redwood City, Calif.

[73] Assignee: Shasta Beverages Division of Consolidated Food Corporation, Hayward, Calif.

[22] Filed: June 19, 1972

[21] Appl. No.: 264,343

[52] U.S. Cl............ 426/477, 99/275, 141/5, 141/6, 426/365
[51] Int. Cl............................................. C02d 1/02
[58] Field of Search......... 99/79, 275, 49, 182, 189, 99/27 S; 261/DIG. 7; 141/5, 6; 426/477, 474, 365, 312, 404

[56] References Cited
UNITED STATES PATENTS

| | | | |
|---|---|---|---|
| 1,275,622 | 8/1918 | Smith | 141/6 |
| 3,256,802 | 6/1966 | Karr | 99/275 |
| 3,395,739 | 8/1968 | Friendship | 141/6 |
| 3,582,351 | 6/1971 | Austin et al. | 99/79 |

Primary Examiner—S. Leon Bashore
Assistant Examiner—Kenneth M. Schor
Attorney, Agent, or Firm—Flehr, Hohbach, Test, Albritton & Herbert

[57] ABSTRACT

A system for continuously preparing a carbonated product and filling containers. Carbon dioxide is applied to a liquid under carbonating pressure and the carbonated liquid is passed to a stabilizing tank maintained at a pressure at least equal to carbonating pressure. Thereafter, the liquid is directed to a pressure reduction tank in which the pressure is lowered to a level just sufficient to produce the desired flow rate to the filler. By reducing the pressure prior to filling, a filler of the gravity or vacuum type may be employed without excessive foaming. Or, if a counter pressure filler is employed, operating pressure is considerably lowered.

2 Claims, 1 Drawing Figure